Dec. 7, 1954 W. G. HOENNINGER ET AL 2,696,182
MACHINE FOR FORMING SECTIONS OF SHEET METAL CONDUITS
Filed Feb. 24, 1951 2 Sheets-Sheet 1
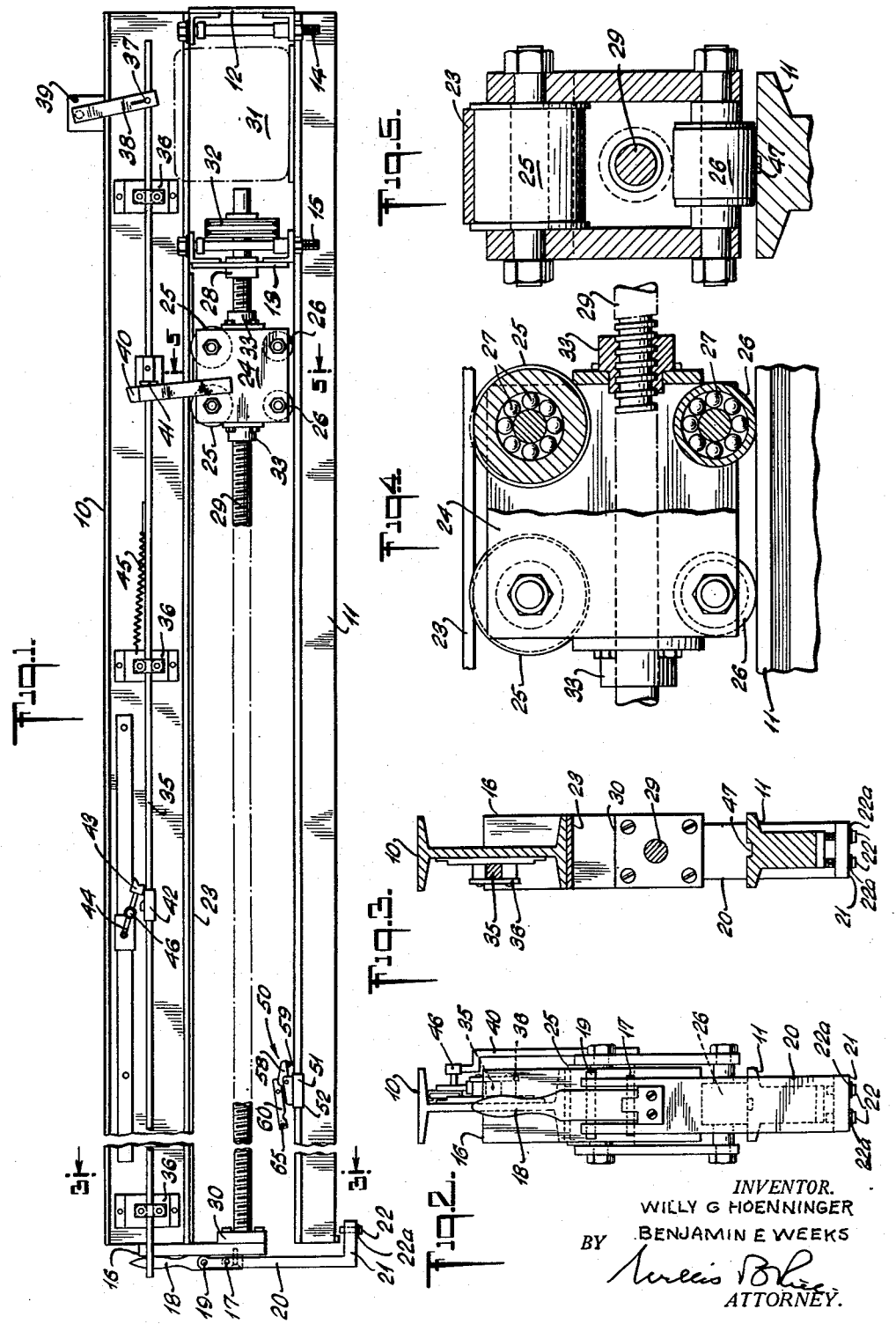
INVENTOR.
WILLY G HOENNINGER
BENJAMIN E WEEKS
BY
ATTORNEY.

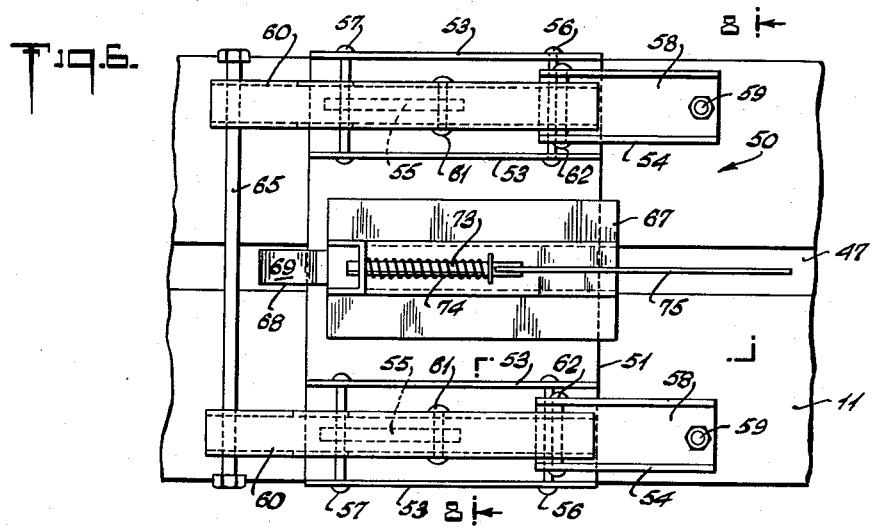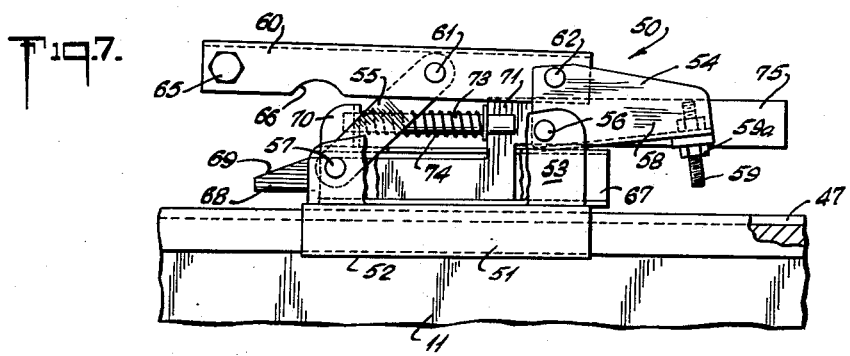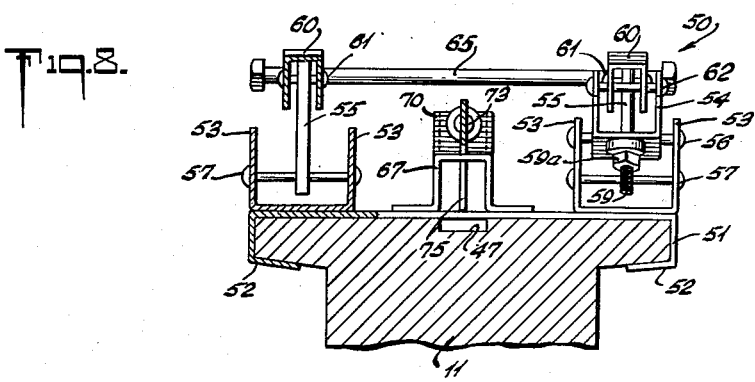

United States Patent Office 2,696,182
Patented Dec. 7, 1954

2,696,182

MACHINE FOR FORMING SECTIONS OF SHEET METAL CONDUITS

Willy George Hoenninger, St. Albans, and Benjamin E. Weeks, Valley Stream, N. Y.

Application February 24, 1951, Serial No. 212,564

2 Claims. (Cl. 113—34)

This invention relates to a machine for forming sections of sheet metal conduit, particularly for use in heating, ventilating and air-conditioning systems. Such conduits are formed of sheet metal which is bent to the desired cross-sectional contour, the abutting edges being interlinked, that is, bent over to form hook-shaped cross-sections, the hooks being interlinked.

It is an object of this invention to take the sections thus formed and close the seam quickly and firmly, preferably in a manner which will depress the seam below the plane of the adjacent surface of the conduit either on the inside or the outside.

It has heretofore been proposed to close a conduit of this type by inserting a mandrel within the conduit beneath the abutting edges and then rolling a roller over it to close the seam against the mandrel. Among these may be mentioned the patents to Robert #1,805,261, Hill #726,729 and Lingren #1,612,519. In devices of this kind and of this invention it is customary to roll the seam closed by rollers mounted on a carriage which travels from one end of the conduit section to the other. These devices, however, have proved inadequate when used for conduits of substantial length and heavy metal.

It is an object of this invention to provide a machine in accordance with which heavy pressures may be applied against the seam and the pressures may be maintained uniform throughout the entire length of the conduit section and to provide mechanism which will drive the carriage forward against the very considerable resistance offered by the seam.

It is a further object to provide a machine of the character described in which the movement of the carriage over the seam and back again is automatically controlled by the movement of the carriage itself, but in which the automatic control can be adjusted to the length of the conduit section being constructed.

It is a further object to provide a machine of the character described with means for holding the conduit section in place in the machine previous to having the seam closed, said holding mechanism being so constructed and so associated with the machine that it will hold the conduit section in place until the seam is completed and will thereupon automatically release the conduit section to permit its immediate removal from the machine.

It is a further object object to provide a machine of the type in which the roller carrying carriage is moved between two horizontal beams with mechanism which will allow the free ends of the beams to give in a manner to take up the slack and free play and to resist the tendency of the beams to separate under the extreme pressure imposed upon them by the carriage.

The invention accordingly comprises a machine possessing the features, properties and the relation of elements which will be exemplified in the device hereinafter described and the scope of the application of which will be indicated in the claims.

For a fuller understanding of the nature and objects of the invention, reference should be had to the following detailed description taken in connection with the accompanying drawings, in which:

Fig. 1 is a side elevation of a device embodying this invention, it being understood that the mechanism here shown will be supported on a suitable stand (not shown);

Fig. 2 is an end view of the device taken from the left hand end of Fig. 1;

Fig. 3 is a section on the line 3—3 of Fig. 1;

Fig. 4 is an enlarged view of the carriage partly in section, showing its relationship to the upper and lower support beams;

Fig. 5 is a section on the line 5—5 of Fig. 1;

Fig. 6 is a top plan of the holding mechanism for holding the conduit section in place for seaming;

Fig. 7 is a side elevation of the same.

Fig. 8 is a section on the line 8—8 of Fig. 7.

In the drawings the numeral 10 represents an upper I-beam and the numeral 11 a lower beam spaced from and parallel to it. The right hand end of these beams as shown in the drawings are held spaced by brackets 12 and 13 and are held against the bracket in spaced relation by bolts 14 and 15, there being one bolt 14 and one bolt 15 on each side of the flange of the beams. The beams may be supported in any convenient manner from a pedestal (not shown) which may be attached to the bracket 12.

The bracket 12 is at the right hand end of the beams as shown and the bracket 13 is spaced inwardly therefrom, so that between the two brackets the beams are held in proper spaced relation. At the other end the left hand end as shown there is attached to the outer end of the beam 10 and extending down from it is a plate 16 and upon this plate there is pivoted at 17 a locking lever 18 which in turn is pivoted at 19 to a link or hook 20 which is bent over beneath the lower beam 11, as shown at 21, and provided with screws 22. Since the pivot 19 is above the pivot 17 it will be clear that when screws 22 upon the bent over end 21 are beneath the end of the beam 11 and the locking lever 18 is raised it will move the link 20 by a toggle action, exerting an adjustable pressure which may be quite heavy upon the outer end of the beam, but will nevertheless maintain it in a very definite position without yielding under pressure, and yet when the lever 18 is moved downwardly, the link 20 will be thrown upwardly to permit the insertion or removal of a conduit section over the end of the beam 11. The screw 22 may be locked by a lock nut 22a.

Mounted upon the outer face of the lower flange of the beam 10 is a plate 23 and between the plate 23 and the upper face of the beam 11 there is mounted a carriage 24 having upper rollers 25 which roll against the plate 23, and lower rollers 26 which roll against the upper face of the beam 11 or of a conduit section upon it. All of these rollers may be provided with ball bearings 27 to reduce the friction to a minimum.

Mounted upon the bracket 13 is a bronze thrust bushing 28 in which is mounted a thread lead screw 29, the other end of which is mounted in a bronze bearing 30 upon the plate 16. The bronze bushing 28 provides a thrust bearing for the lead screw while moving in either direction of rotation. The lead screw 29 may be driven from a motor 31 in any suitable manner. It is here illustrated in the form of a pulley 32 which may be suitably driven from the motor 31.

The carriage 24 is provided with two threaded bushings 33, one at each end, both of which mesh with the lead screw so that the strain of driving the carriage against the resistance of the metal, is distributed, and the stiffness of the lead screw assists in resisting any tendency of the carriage to cant.

The motor is controlled by a rod 35 having slide bearings 36 attached to the flange of the I-beam 10. This rod 35 is pivotally connected by a pin 37 to a lever 38 operating a three-position drum switch 39. The motor 31 is a reversible motor, and it is so connected that when the rod 35 is in center position, as shown, the motor is idle, but when it is moved to the right to its maximum then the motor 31 is operated in a direction to move the carriage to the left, but when the rod 35 is moved to the left to the maximum, the carriage is moved to the right.

Mounted upon the carriage is an arm 40 adapted to cooperate with a block 41 upon the rod 35 in such a manner that as the carriage moves back to the right at the end of its return stroke it will move the control rod 35 and hence the arm 40 to a position to stop the motor. When, however, it is desired to begin another forward stroke, the rod 35 is moved still further to the right, whereupon the drum switch 39 again connects the motor in a direction to move the carriage to the left. A finger 42 is provided upon the rod 35 in a position to be engaged by a latch 43 carried by a pivoted arm 44 to hold the rod 35 in extreme right position when manually moved to that position, while a spring 45 connects the rod 35 with the frame in such a manner as to urge the rod 35 to the left against the effect of the latch 43. This finger 42 and latch 43 can only connect when the rod 35 has been moved far enough to the right to start the motor in a direction to move the carriage to the left.

The arm 40 at the end of its stroke engages the pin 46 upon the lever 44, thereby raising the latch 43 and releasing the rod 35 which then moves to the left as far as it will go, moving the drum switch to the point where it actuates the motor 31 in the reverse direction back to the point shown in Fig. 1, at which point the rod 35 is held in neutral position by arm 40.

As will be seen from Figs. 2 and 3, the upper face of the lower beam 11 has a longitudinal channel cut into it, as shown at 47, of a width slightly greater than the turned over edges of the sheet from which the conduit section is formed and of a depth substantially equal to three thicknesses of the metal of the conduit section.

With this construction, in order to form a conduit section, the lever 16 is released and the link 20 raised. This permits the open seamed conduit section, having its bent over edges interlocked to be slid over the open end of the lower beam, until the front end of the seam is caught under the front wheel 26, the seam being aligned with the longitudinal channel.

In order to hold the section in proper position to have its seam closed, there is provided, according to this invention, a clamping member designated generally at 50, which is carried by the lower beam. This clamp comprises a base 51 adapted to rest upon the upper face of the lower beam having its sides bent down at 52 and under the upper flange of the beam to hold the clamp in sliding engagement with the beam. Mounted on each side of the center line of the base are two clamps arranged to clamp the conduit section to the upper face of the beam on each side of the seam. These two clamps are alike and will be identically numbered.

For each clamp there is mounted on the upper face of the base 51 a pair of upwardly extending spaced flanges 53, between which there is placed at the right hand end as seen in Fig. 6 a clamping dog 54 and at the left hand end a link 55 which are pivoted on pivot rods 56—57 respectively. The clamping dog 54 has a forward extending arm 58 carrying the finger 59 which engages the conduit. This finger is adjustable in height. As shown, it takes the form of a screw which is held in adjusted positions by a lock nut 59a.

An operating arm 60 has its center pivoted at 61 to the link 55 and has its right hand end pivoted to the dog 54 at 62 above the pivot 56. The length and position of this arm 60 is such that when the arm is in its lowest position the pivots 56, 61 and 62 are in alignment, so that the operating arm and the link 55 form a toggle by which the screw 59 may be caused to bear against the conduit section with great force. The other end of the operating arm 60 extends to the left. The two ends of the two arms 60 are connected by a rod 65, which serves as a handle by which the two clamps can be simultaneously operated and released. As will be seen, since as shown the arms 60 are straight, there is provided in each, a notch 66 to receive the pivot 57 and thus permit the toggle to be completely extended, and yet prevent its passing too far beyond dead center.

Also slidably mounted upon the base is a plate 67 having an arm 68 with an inclined face 69. This arm is so arranged that when moved to the left, it will engage the rod 65, to force it upward to break the locking of the toggle, and release the conduit section. Spring means are provided to hold the plate 67 in its right hand position, shown as a flange 70 extending up from the base, and a flange 71 extending up from the plate, each of which has a bearing for a rod 73 extending between them, upon which is compressed a spring 74. A bar 75, attached to the rod 73, extends to the right in position to be engaged by the front edge of the carriage 24 when it reaches the end of its forward stroke, thus releasing the conduit section so that it can be removed as soon as the carriage has moved back.

With the construction here shown, it is possible to fabricate the conduit sections very rapidly, and to close the seams perfectly even when the sections are made from heavy sheet, because the toggle arrangement of operating lever 18 gives a very firm holding of the distance between the beams to resist the pressure of the rolls while at the same time locking them in exact position to which it is adjusted, so that the pressure will be just that desired throughout the entire length of the conduit section.

Where conduits are to be made of varying thicknesses of metal, the distance between the beams may be adjusted to compensate by varying the adjustment of the bolts 14 and 15, while at the same time varying the screw 22 by a corresponding amount. If desired, a strip 76 of width equal to the channel 47 and of thickness equal to four times the difference in thickness of the thinner metal may be laid within the channel, so that the seam of the thinner metal section will be completely closed.

Special advantages are obtained in this device by feeding the carriage by the lead screw 29, instead of by a chain as has been customary, since it gives a steadier drive, more easily automatically controlled, it enables a greater drive force to be exerted within practical limits, and, which is a matter of some importance, the lead screw may be made to engage the carriage at both front and back end, thereby helping to steady the carriage in its forward movement, without tending to cant about the lower front wheel, thus insuring a uniform pressure upon all parts of the seam, and a steadier drive.

Once the conduit section is put in place upon the lower beam, with its front end engaged beneath the front wheel, the clamping member 50 will be slid up against the end of the section until its base engages the edge of the section to stop further movement of the clamping member, thereupon, the clamping member, which is being moved by the rod 65, is operated to clamping position by the continued movement of the rod 65. It will be observed that this is all done by a single movement. Thereupon, the operator pushes in the rod 35 and the carriage starts its automatic movement closing the seam during the forward movement of the carriage, then releasing the clamp and moving back to the starting point, where it stops for the change of sections. During this movement of the machine, which requires no attention from the operator, the operator is free to dispose of the previously formed section and get another unformed section ready to be put into the machine as soon as the stroke is complete.

Since the channel 47 is made of a thickness equal to three times the thickness of the sheet metal used, all of the underlying thicknesses of metal at the seam will be pressed below the remainder of the sheet, leaving the outer surface flush, giving a good workmanlike job. In some cases, however, the job may require that the seam shall be flush with the inside surface.

Since certain changes may be made in the above construction and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which as a matter of language might be said to fall therebetween.

What is claimed is:

1. The combination with a conduit forming device, comprising a beam on which a conduit section with open seam may be placed, a carriage having a roller the periphery of which is in alignment with said beam, to roll the seam closed, and a clamp comprising a body adapted to be fixed at different positions upon the upper face of said beam, an arm pivoted to said body in position to engage a conduit section and press the same against said beam, a link pivoted to said arm above said first mentioned pivot, a second link pivoted to said body and to said first mentioned link, to form a toggle which when extended will press said arm against said section, and a member slidable upon said body having a rod extending in a direction to be moved by the carriage at the completion of the seaming operation and having an arm positioned to engage said toggle to open the same.

2. The combination with a conduit forming device comprising a beam on which a conduit section with open seam may be placed, a carriage having a roller the periphery of which is in alignment with said beam, to roll the seam closed, and a clamp comprising a body adapted to be fixed at different positions upon the upper face of said beam, said body having a pair of arms pivoted in position to engage said conduit section on opposite sides of said seam to press the section against the beam, each of said arms having a link pivoted to said arm above said first mentioned pivot, a second link pivoted to said body and to said first mentioned link, to form a toggle which when extended will press said arm against said section, and a member slidable upon said body having a rod extending in a direction to be moved by the carriage at the completion of the seaming operation and having an arm positioned to engage said toggle to open the same.

References Cited in the file of this patent

UNITED STATES PATENTS

| Number | Name | Date |
| --- | --- | --- |
| 492,775 | Bosley | Mar. 7, 1893 |
| 890,526 | Numan | June 9, 1908 |
| 907,084 | McKenzie | Dec. 15, 1908 |
| 968,994 | Smith | Aug. 30, 1910 |
| 1,158,794 | Drumm | Nov. 2, 1915 |
| 2,363,507 | Dewey | Nov. 28, 1944 |